United States Patent [19]

Douglas et al.

[11] Patent Number: 4,772,079
[45] Date of Patent: Sep. 20, 1988

[54] COVER ASSEMBLY FOR REMOVABLY MOUNTED ELECTRONIC EQUIPMENT

[75] Inventors: Arthur E. Douglas, Lynchburg; Tye C. Drinkard, Forest; Norwood P. Shorter, Brookneal, all of Va.

[73] Assignee: General Electric Co., Lynchburg, Va.

[21] Appl. No.: 911,721

[22] Filed: Sep. 26, 1986

[51] Int. Cl.[4] ............................................. A47B 48/00
[52] U.S. Cl. ................................... 312/257 R; 109/50; 206/328; 455/347; 312/7.1
[58] Field of Search ..................... 312/7.1, 208, 257 R; 109/24, 50, 52, 74, 79; 206/328, 334; 455/90, 128, 345, 346, 347, 348

[56] References Cited

U.S. PATENT DOCUMENTS

| | | | |
|---|---|---|---|
| 3,101,225 | 8/1963 | Penningroth | 455/345 |
| 3,615,006 | 10/1971 | Freed | 206/328 |
| 3,650,444 | 3/1972 | Gibson et al. | |
| 4,102,554 | 7/1978 | Reimer | 312/208 |
| 4,194,157 | 3/1980 | Uno | |
| 4,214,797 | 7/1980 | Borresen et al. | |
| 4,270,225 | 5/1981 | Bentlage et al. | |
| 4,458,813 | 7/1984 | Tushinsky et al. | 206/328 |
| 4,652,969 | 3/1987 | Stegenga | 206/328 |

Primary Examiner—Kenneth J. Dorner
Assistant Examiner—Gerald A. Anderson
Attorney, Agent, or Firm—Nixon & Vanderhye

[57] ABSTRACT

The combination of an electronic device to be mounted in a vehicle, such as a cellular car phone, citizen band radio and the like, and a cover assembly for at least partially enclosing a housing for the device wherein the cover assembly includes separable top and bottom sections. Each section has integrally formed attachment means engageable with complementary attachment means formed on the housing. The housing is also provided with a rotatable cam element for engagement with a slot formed in the bottom cover section for releasably locking the cover assembly to the housing. The bottom cover section may also serve as a the mounting frame for securing the device to a support surface in a vehicle.

18 Claims, 3 Drawing Sheets

COVER ASSEMBLY FOR REMOVABLY MOUNTED ELECTRONIC EQUIPMENT

This application is related to commonly assigned copending design application Ser. No. 900,035 filed Aug. 25, 1986 naming Culbertson e al as inventors.

This invention relates to a self-locking cover assembly, preferably made of plastic, for communications and other electronic equipment, such as cellular mobile phones, citizen band radios and audio components which are typically removably mounted in vehicles. Equipment of this type is typically fastened to a sub-frame assembly by screws and bolts or other separate fastening hardware elements. The sub-frame is, in turn, mounted to an appropriate surface in the vehicle, using still additional fastening hardware. See, for example, U.S. Pat. No. 3,650,444 and U.S. Pat. No. 4,270,225, which disclose typical mounting structures which require screws or bolts and nuts, etc. However, with such arrangements, the mounting of electronic equipment often proves to be a time consuming experience, fraught with difficulty, not the least of which is the requirement to manipulate screws, washers, nuts and the like in the hard to reach spaces in and around the dash area of a vehicle.

The problem is compounded by the fact that it is desirable and/or necessary to remove the equipment from the vehicle from time to time for any of a variety of reasons, and to thereafter reinstall it.

The primary purpose of this invention is to provide a relatively inexpensive, easily manufactured and easily manipulated cover assembly which can be secured to such electronic equipment with integrally formed attachment means which obviate the need for screws, bolts, or other fastening hardware.

While covers for various types of equipment have been proposed which make some use of integral attachment means, such arrangements, as in U.S. Pat. Nos. 4,194,157 and 4,214,797, are not suitable in the context of the present invention.

In the present invention, a one-piece top cover section and a one-piece bottom cover section are provided with a plurality of apertures or slots of various configurations which are designed to receive a plurality of tabs or pins integrally formed on the housing walls of, for example, a cellular mobile phone. In addition, a cam locking arrangement is provided to lock the cover assembly in place about the housing. The top cover section consists of a planar portion provided with depending front, rear and side walls, while the bottom cover section consists of a generally planar portion provided with upstanding rear and side walls, the entirety of the cover assembly substantially, but not completely enclosing the housing.

In the preferred embodiment, the upper or top cover section is provided with attachment means in the form of at least two, and preferably three, laterally spaced, elongated slots on the front wall which are designed to fit over and receive a corresponding number of similarly shaped projections integrally formed on the front wall of the housing. The rear wall of the top cover section is formed with a pair of laterally spaced, depending strap members, each of which is provided with a generally round aperture which is designed to receive a so-called bullet-nose pin integrally formed on the rear wall of the housing.

As previously indicated, on the bottom cover section only side and rear upstanding walls are provided. On the planar surface of the bottom cover, adjacent the front edge and intermediate the side walls, there is providedd an irregularly-shaped aperture adapted to receive a rotatable locking tab, or cam surface, provided on the front wll of the housing. The rear upstanding wall of the bottom cover section includes a pair of integrally formed, laterally spaced and relatively rigid upstanding tabs, provided with apertures designed to fit over and receive the same bullet nose pins formed on the rear wall of the housing as are associated with the strap members on the top cover section.

In a preferred embodiment, the bottom cover section also constitutes the mounting frame for securing the housing to an appropriate interior surface of a vehicle and, to this end, additional mounting apertures are provided in the planar portion of the bottom cover section.

To secure the cover assembly to the housing, the front wall of the top cover section is hooked over the projecting tabs on the front wall of the housing, with the rear wall straps hanging down along the back or rear side of the housing. These straps are then pulled over the bullet-nose pins on the rear housing wall, until the apertures in the straps snap in place over the pins.

The bottom cover section is then positioned below the housing so that the apertures in the upstanding tabs formed on the rear wall may be placed over the bullet-nose pins on the housing. With the bottom cover section properly oriented, the cam locking element on the front wall of the housing is then rotated from a release position into the slot located adjacent the front edge of the bottom cover section planar surface. In this manner, the entire cover assembly is accurately and securely locked to the housing. It will be appreciated that the rotatable locking cam may be key actuated to provide further security.

It is to be understood that where the bottom cover section constitutes the mounting frame for securing the housing within the interior of a vehicle, the lower or bottom cover section is first secured in place to the desired mounting surface. Then, the housing, with the top cover section in place, is positioned over the bottom cover section and secured in the manner described hereinabove. This arrangement facilitates easy installation and removal of the housing for maintenance, repair, etc., as well as subsequent reinstallation without the need for screws, bolts, or other additional fastener elements.

DETAILED DESCRIPTION OF AN EXEMPLARY EMBODIMENT

Figure 1:
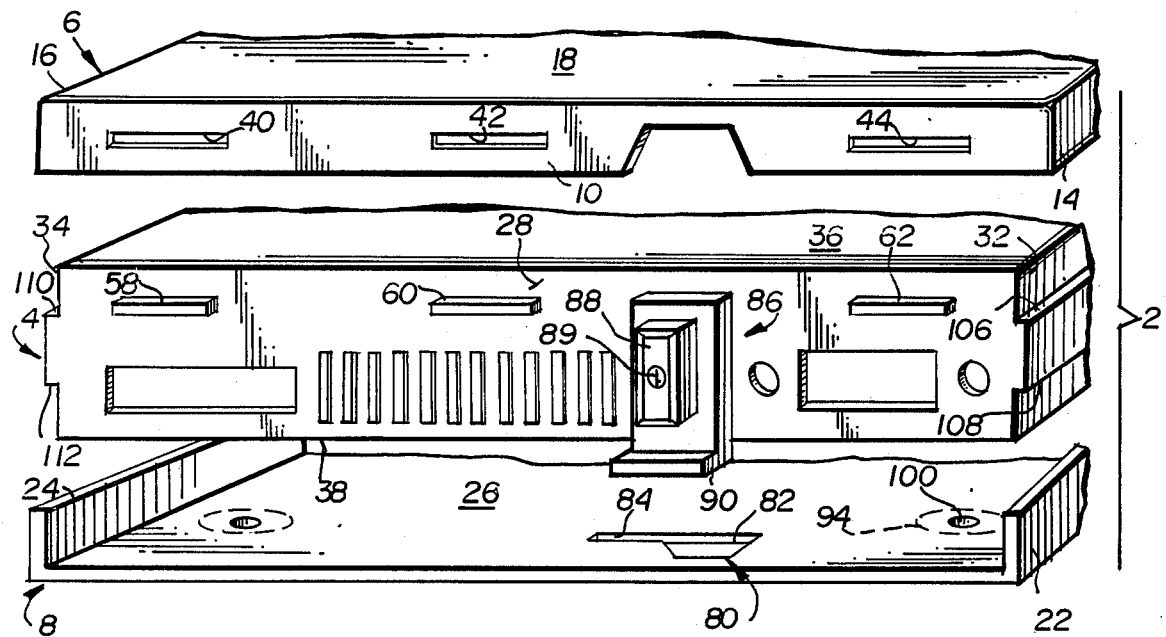
FIG. 1 is a partial perspective view of the front of an electronic-type equipment housing with the cover assembly separated therefrom.

Referring to FIGS. 1 through 6, a cover assembly 2 for electronic equipment, such as a cellular car phone, citizen band or stereo radio, or the like, includes a top cover section 6 and a separate bottom cover section 8 for partially enclosing the equipment housing 4. The cover assembly is preferably constructed of relatively rigid plastic material, although a lightweight metal material may also be utilized. The top cover section 6 is of a one-piece construction, and comprises a front wall 10, a rear wall 12, and side walls 14 and 16 which surround a top planar surface 18.

The bottom cover section 8 is similarly of one-piece construction, and comprises a rear upstanding wall 20, and upstanding side walls 22, 24 which partially surround a bottom planar surface 26.

The top and bottom cover sections 6, 8 are designed to be secured to, and substantially enclose, the housing in a manner to be described in greater detail hereinbelow.

The housing 4 consists generally of a front wall 28 which constitutes a control panel, a rear wall 30, side walls 32, 34, an upper planar surface 36 and a lower planar surface 38.

Figure 2:
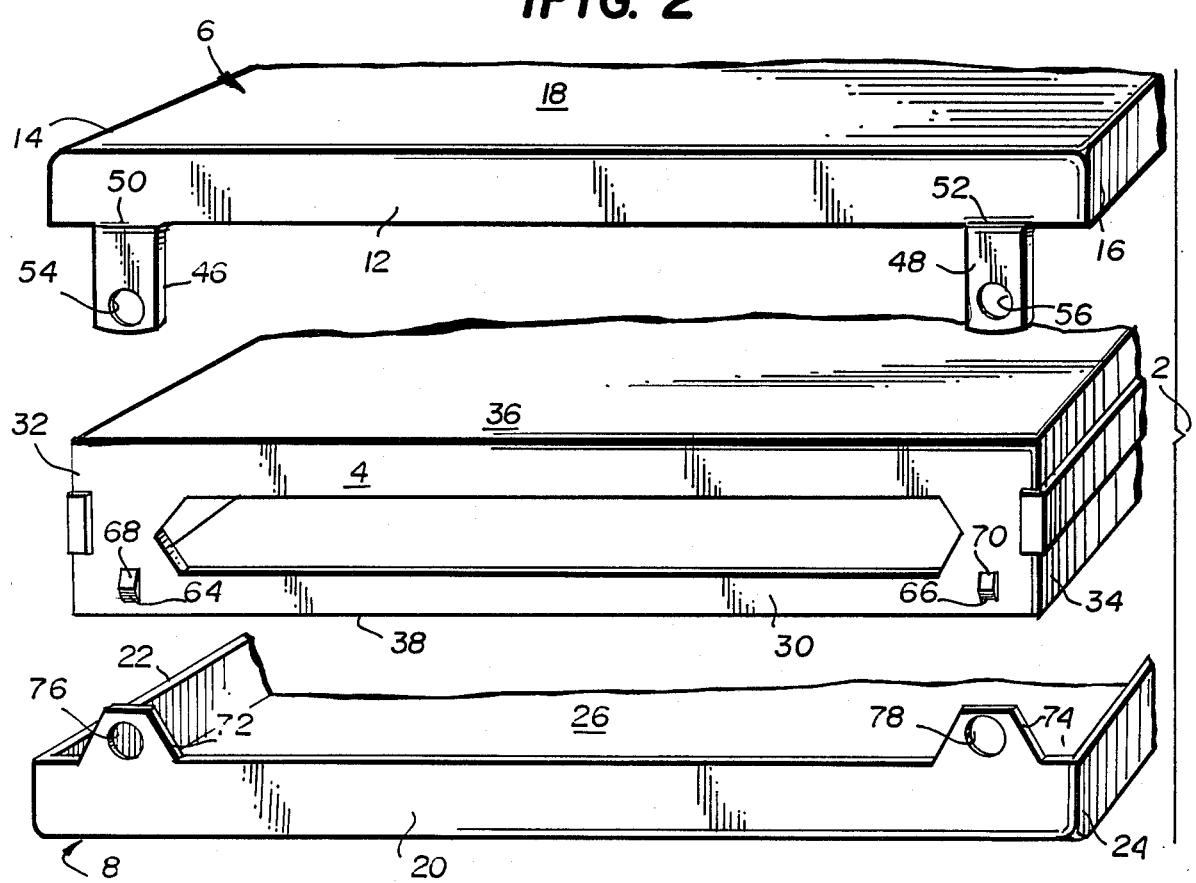
FIG. 2 is a partial perspective view of the rear of the housing and separated cover assembly shown in FIG. 1.

In order to secure the top cover section 6 to the housing 4, three slots 40, 42 and 44 are formed in the front wall 10 of the top cover section. In addition, as illustrated in FIG. 2, the rear wall 12 of the top cover section is provided with a pair of integral strap members 46, 48 provided with apertures 54, 56 respectively. It is to be understood that strap members 46 and 48 are flexible by reason of integral hinges 50, 52 which are, in fact, formed by thinned wall areas where the straps merge with the rear wall 12.

The slots 40, 42 and 44 formed on the front wall 10 of the upper or top cover section 6 are designed to receive complementary shaped projecting tabs 58, 60 and 62 formed on the front wall 28 of the housing 4. While these slots and mating projections are illustrated to be of generally rectangular shape, it is understood that other configurations, e.g., circular, square, etc., may be employed with equal effectiveness.

Strap members 46, 48 on the rear wall 12 of the top cover section 6 are designed to fit over a pair of bullet-nose pins 64, 66 provided on the rear wall 30 of the housing, so that the pins are received in the apertures 54, 56 provided in the straps. Downward sloping surfaces 68, 70 formed on the pins 64, 66 facilitate attachment of the top cover section by providing a ramp surface for strap members 46, 48, enabling the strap members to slide over the downwardly sloping surfaces and to snap into the desired orientation as they flex about hinges 50, 52.

Self-locking attachment means for the bottom cover section 8 include integrally formed, relatively rigid upstanding tabs 72, 74 provided on the rear wall 20. Tab 72 has an aperture 76 formed therein while tab 74 has a similar aperture 78. Tabs 72 and 74 are designed to fit over and to receive the same bullet-nose pins 64, 66 that are associated with the top cover section straps 46, 48.

Figure 7:
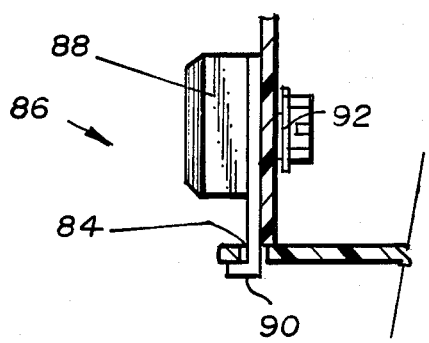
FIG. 7 is a partial cross-sectional view showing a cam locking arrangement between the front wall of the housing and the bottom cover section.
Figure 8:
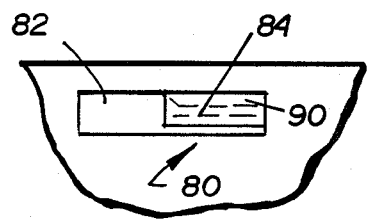
FIG. 8 is a partial bottom view of the cam locking arrangement illustrated in FIG. 7.
Figure 5:
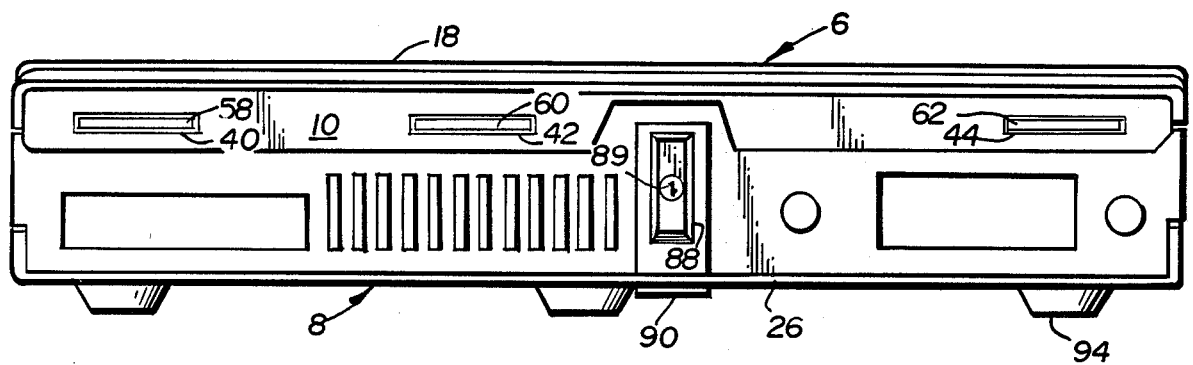
FIG. 5 is a front end view showing the cover assembly secured in place to the housing.
Figure 6:
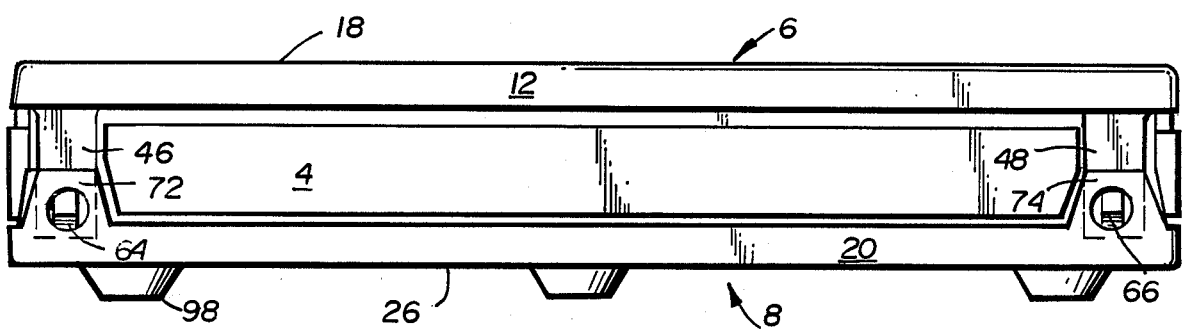
FIG. 6 is a rear end view showing the cover assembly secured in place to the housing.

The bottom cover section 8 is also provided with an irregularly-shaped slot 80 formed in the planar surface 26 adjacent the front edge thereof and intermediate the side walls 22, 24. The slot includes a relatively enlarged section 82 and a relatively narrow section 84. The slot is designed to cooperate with a cam element 86 provided on the front wall 28 of the housing 4. The cam element 86 as most clearly shown in FIGS. 1 and 7, comprises a generally L-shaped member provided with a knob 88 by which the cam element may be rotated about a pin 92 which projects through the front wall of the housing. For security purposes, knob 88 may be provided with a conventional key slot 89 for an internal locking mechanism (not shown) so that cam element 86 can be rotated only upon insertion of a key (not shown). The cam element also includes a projecting cam surface 90 which may be rotated in a clockwise direction from a release position through the enlarged section 82 of the slot 80 and into a secure locking position within the narrower section 84 of the slot. The locking position of the cam element is shown more clearly in FIG. 8.

To assemble the top and bottom cover sections 6, 8 to the housing 4, the top cover section is first placed over the top of the housing so that projecting tabs 58, 60 and 62 are received in corresponding slots 40, 42 and 44. Straps 46, 48 are thereafter pushed downwardly over ramp surfaces 68, 70 formed on bullet-nose pin 64, 66 until the straps snap into place with the apertures 54, 56 overlying the pins 64, 66.

The bottom cover section 8 is then positioned below the housing so that pins 64, 66 are received in apertures 76, 78 provided in upstanding rigid tabs 72, 74. As shown more clearly in FIG. 4, the upstanding tabs 72, 74 are located outwardly of the strap members 46, 48.

The cam element 86 is then rotated in a clockwise direction from a release position so that cam surface 90 enters slot 80 through the enlarged section 82 and thereafter into the narrow section 84. It is to be appreciated that the cover assembly is effectively locked to the housing when the cam element is received in the narrow section of the slot. Neither the top nor bottom cover sections may be removed thereafter without first rotating the cam element out of the slot 80.

While it may appear that ramp surfaces 68, 70 would allow tabs 72, 74 to slide off the bullet-nose pins, because tabs 72, 74 are relatively rigid and because they do not include integral hinge portions as in the case of strap members 46, 48, they remain securely in place, particularly inasmuch as the bottom cover section is pulled slightly forwardly as the cam locking surface 90 is rotated into the smaller portion 84 of the slot 80.

Figure 3:
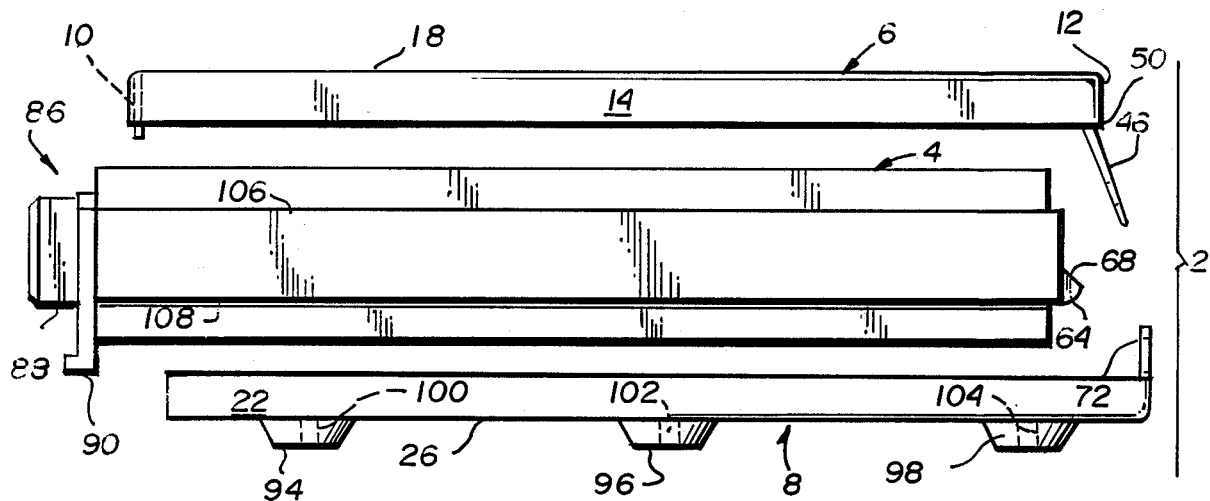
FIG. 3 is a side view of the housing and separated cover assembly as shown in FIG. 1.
Figure 4:
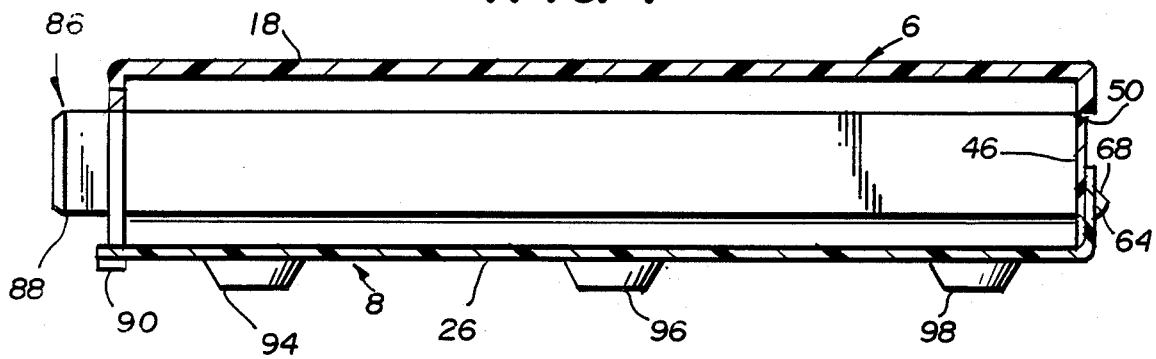
FIG. 4 is a partial side sectional view showing the cover assembly secured in place to the housing.

It is also a feature of this invention that the bottom cover section 8 may comprise the frame mounting means by which the housing is attached to a vehicle or other supporting surface. To this end, as many as six mounting bosses may be formed in the planar surface 26 of the bottom cover section. Three of such bosses, denoted by reference numerals 94, 96 and 98 are shown in FIGS. 3 and 4, each of which is provided with a aperture 100, 102 and 104 through which mounting bolts or other suitable fastening means (not shown) may extend. With this arrangement, the bottom cover section is initially secured to the mounting surface. The housing 4, with top cover section 6 in place, is then positioned on the bottom cover section 8 so that the upstanding tabs 72, 74 on the rear wall 20 of the bottom cover section are placed over the bullet-nose pins 64, 66, and cam element 86 is rotated into locking position in the same manner as described hereinabove.

Additional means may be provided to insure a secure and stable arrangement between the top and bottom cover sections and the housing 4. For example, each of the side walls 32, 34 of the housing may be provided with a pair of abutment shoulders 106, 108, and 110, 112, respectively, for engagement with the edges of the side walls of the top and bottom cover sections.

It is thus seen that the present invention provides an easily assembled, self-locking cover assembly for an electronic equipment type housing without any need for additional fastening hardware such as screws or bolts. Moreover, the present invention provides for quick installation and removal of the from the vehicle in the event that repair and/or maintenance is required. With the bottom cover section more or less permanently mounted in place in the vehicle, the housing and top cover section may be removed and reinstalled as desired without the use of any tools, simply by turning the cam element to a release position, (using a key if the security lock is provided), lifting the front end of the housing, and sliding it forwardly to disengage tabs 72, 74 from pins 64, 66.

While the present invention has been disclosed in what is believed to be the most practical embodiment, it will be apparent to those of ordinary skill in the art that various changes and alterations may be made without departing from the spirit and scope of the invention as defined by the claims which follow.

We claim:

1. A self-locking cover assembly for attachment to a housing having top and bottom surfaces joined by front, rear and side walls, said cover assembly comprising:
   (a) a one-piece top cover section provided with depending front, rear and side walls, at least two of said top cover section walls having internal attachment means associated therewith for securing said top cover section to said housing;
   wherein the attachment means associated with one of said top cover section walls comprises a pair of laterally-spaced straps, integrally formed with said one wall, and each having an aperture formed therein adapted to fit over and receive projecting nose pins provided on one of said housing walls;
   (b) a one-piece bottom cover section provided with upstanding rear and side walls and including internal attachment means associated therewith for securing said bottom cover section to said housing;
   wherein the attachment means associated with said bottom cover section comprises a pair of laterally spaced upstanding rigid tabs, each of which is provided with an aperture, said apertures adapted to fit over and receive said projecting nose pins; and
   wherein said integral attachment means formed on said top and bottom cover sections are adapted to cooperate with complementary attachment means provided on walls of said housing, including said projecting nose pins, to secure said cover assembly to said housing.

2. A self-locking cover assembly as defined in claim 1 wherein said straps are formed integrally with the rear wall of said top cover section.

3. A self-locking cover assembly as defined in claim 1, wherein the attachment means associated with another of said top cover section walls comprises at least a pair of laterally spaced apertures adapted to fit over and receive projecting tabs formed on another of said housing walls.

4. A self-locking cover assembly as defined in claim 3, wherein said laterally spaced apertures are provided in the front wall of said top cover section.

5. A self-locking cover assembly as defined in claim 1 wherein said upstanding rigid tabs are formed in the rear wall of said bottom cover section.

6. A self-locking cover assembly as defined in claim 1 wherein said straps and said upstanding rigid tabs overlap on said projecting nose pins.

7. A self-locking cover assembly as defined in claim 1, wherein said bottom cover section further includes means for facilitating the mounting of said bottom cover section to a support surface.

8. A self-locking cover assembly as defined in claim 1 wherein the attachment means associated with said bottom cover section further comprises an irregularly shaped slot adjacent a front edge thereof, said slot adapted to receiver a rotatable cam element provided on the front wall of said housing.

9. A self-locking cover assembly as defined in claim 8, wherein said irregularly-shaped slot includes an enlarged portion for initially receiving a projecting cam surface of said cam element during rotation of said rotatable cam element from a release position, and a relatively narrow portion for receiving said cam surface in a locked position.

10. A combination electronic device and self-locking cover assembly comprising:
   a housing enclosing the device and including top and bottom surfaces joined by front, rear and side walls, the front wall of which is provided with controls for operating the device;
   attachment means provided on said front and rear walls of said housing;
   a top cover section having a surface surrounded by depending front, rear and side walls;
   a bottom cover section having a surface partially surrounded by upstanding rear and side walls;
   said top and bottom cover sections having integral attachment means associated therewith for cooperative engagement with the attachment means provided on said housing for assembling said cover assembly to said housing;
   means for releasably locking said cover assembly to said housing associated with one of said housing walls and one of said top and bottom cover sections;
   wherein said attachment means provided on said front and rear walls of said housing comprise at least a pair of projecting members on each of said walls, and wherein said integral attachment means associated with said top cover section comprise at least a pair of apertures associated with each of said front and rear walls thereof, whereby said top cover section may be attached to said housing by locating the top cover section such that the projections on the front wall of said housing are received within the apertures associated with the front wall of said top cover, and the projections on the rear wall of said housing are received within the apertures associated with the rear wall of said top cover; and
   wherein said integral attachment means associated with said bottom cover section comprise at least a pair of apertures associated with the upstanding rear wall thereof, whereby said bottom cover section may be at least partially attached to said housing by locating the bottom cover section such that the projections on the rear wall of said housing are received within the apertures associated with the upstanding rear wall of said bottom cover section.

11. The combination as defined in claim 10 wherein the apertures associated with the rear wall of the top cover section are provided in strap members integrally formed with, and extending below, said rear wall, said strap members joined to said rear wall by an integral hinge defined by a reduced thickness wall portion.

12. The combination as defined in claim 10, wherein the apertures associated with the rear wall of the bottom cover section are provided in relatively rigid upstanding tabs integrally formed with and extending above, said rear wall of said bottom cover section.

13. The combination as defined in claim 10, wherein said bottom cover section is further provided with means for facilitating the mounting of said electronic device and said self-locking cover assembly to a support surface.

14. The combination as defined in claim 10, wherein said means for releasably locking said cover assembly to said housing includes a cam surface mounted on the front wall of said housing and rotatable into engagement with the bottom cover section through a slot formed in said bottom cover surface.

15. The combination as defined in claim 14, wherein said slot formed in said bottom cover surface includes an enlarged portion for initially receiving said cam surface during rotation thereof from a release position, and a relatively narrow portion for receiving said cam surface in a locked position.

16. The combination as defined in claim 14, wherein said cam surface is formed on a rotatable cam element provided with a key-actuated security lock.

17. A self-locking cover assembly for attachment to a housing having top and bottom surfaces joined by front, rear and side walls, said cover assembly comprising:
(a) a one-piece top cover section provided with depending front, rear and side walls, at least two of said top cover section walls having integral attachment means associated therewith for securing said top cover section to said housing; wherein the attachment means associated with one of said top cover section walls comprises a pair of laterally-spaced straps, integrally formed with said one wall, and each having an aperture formed therein adapted to fit over and receive projecting nose pins provided on one of said housing walls;
(b) a one-piece bottom cover section provided with upstanding rear and side walls and including integral attachment means associated therewith for securing said bottom cover section to said housing; wherein the attachment means associated with said bottom cover section comprises a pair of laterally spaced upstanding rigid tabs, each of which is provided with an aperture, said apertures adapted to fit over and receive said projecting nose pins;
whereby said integral attachment means formed on both said top and bottom cover sections are adapted to cooperate with said projecting nose pins provided on said housing walls to secure said cover assembly to said housing.

18. A combination electronic device and self-locking cover assembly comprising:
a housing enclosing the device and including top and bottom surfaces joined by front, rear and side walls, the front wall of which is provided with controls for operating the device;
attachment means provided on said front and rear walls of said housing;
a top cover section having a surface surrounded by depending front, rear and side walls;
a bottom cover section having a surface partially surrounded by upstanding rear and side walls;
said top and bottom cover sections having integral attachment means associated therewith for cooperative engagement with the attachment means provided on said housing for assembly said cover assembly to said housing; and
means for releasably locking said cover assembly to said housing associated with one of said housing walls and one of said top and bottom cover sections;
wherein said attachment means provided on said front and rear walls of said housing comprise at least a pair of projecting members on each of said walls, and wherein said integral attachment means associated with said top cover section comprise at least a pair of apertures associated with each of said front and rear walls thereof, whereby said top cover section may be attached to said housing by locating the top cover section such that the projections on the front wall of said housing are received within the apertures associated with the front wall of said top cover, and the projections on the rear wall of said housing are received within the apertures associated with the rear wall of said top cover, and wherein said integral attachment means associated with said bottom cover section comprise at least a pair of apertures associated with the upstanding rear wall thereof, whereby said bottom cover section may be at least partially attached to said housing by locating the bottom cover section such that the projections on the rear wall of said housing are received within the apertures associated with the upstanding rear wall of said bottom cover section.

* * * * *